(12) United States Patent
Hsieh

(10) Patent No.: US 6,768,512 B1
(45) Date of Patent: Jul. 27, 2004

(54) METHOD OF BAD PIXEL CORRECTION

(75) Inventor: Ming-Tsun Hsieh, Mountain View, CA (US)

(73) Assignee: Vanguard International Semiconductor Corp., Hsinchu (TW)

( * ) Notice: Subject to any disclaimer, the term of this patent is extended or adjusted under 35 U.S.C. 154(b) by 857 days.

(21) Appl. No.: 09/671,565

(22) Filed: Sep. 27, 2000

Related U.S. Application Data

(60) Provisional application No. 60/217,550, filed on Jul. 12, 2000.

(51) Int. Cl.[7] .............................. H04N 9/64; G06K 9/40; H01L 27/00
(52) U.S. Cl. ........................ 348/246; 348/245; 382/275; 250/208.1
(58) Field of Search ................................ 348/246, 247, 348/243, 245; 250/208.1; 358/529, 518; 382/275

(56) References Cited

U.S. PATENT DOCUMENTS

| | | | | |
|---|---|---|---|---|
| 4,661,713 A | * | 4/1987 | Besson et al. | 348/247 |
| 4,701,784 A | * | 10/1987 | Matsuoka et al. | 348/247 |
| 4,894,721 A | * | 1/1990 | Matsuda | 348/247 |
| 4,920,428 A | * | 4/1990 | Lin et al. | 348/246 |
| 5,047,863 A | * | 9/1991 | Pape et al. | 348/247 |
| 5,198,906 A | * | 3/1993 | Yamashita | 348/246 |
| 5,278,658 A | * | 1/1994 | Takase | 348/243 |
| 5,291,293 A | * | 3/1994 | Kapan | 348/246 |
| 5,355,164 A | * | 10/1994 | Shimoyama et al. | 348/243 |
| 5,392,070 A | * | 2/1995 | Endo et al. | 348/247 |
| 5,436,659 A | * | 7/1995 | Vincent | 348/246 |
| 5,499,114 A | * | 3/1996 | Compton | 348/246 |
| 6,381,357 B1 | * | 4/2002 | Tan et al. | 348/246 |
| 6,614,473 B1 | * | 9/2003 | Kijima | 348/243 |
| 6,614,946 B1 | * | 9/2003 | Edgar et al. | 382/275 |
| 6,642,961 B1 | * | 11/2003 | Hsieh | 348/247 |
| 6,704,458 B2 | * | 3/2004 | Ford | 382/275 |
| 6,707,493 B1 | * | 3/2004 | Lee et al. | 348/246 |

FOREIGN PATENT DOCUMENTS

| | | | | |
|---|---|---|---|---|
| EP | 917358 A1 | * | 5/1999 | H04N/5/217 |
| JP | 10150570 A | * | 6/1998 | H04N/1/409 |
| JP | 11018012 A | * | 1/1999 | H04N/5/335 |
| JP | 2000023051 A | * | 1/2000 | H04N/5/335 |

OTHER PUBLICATIONS

Tan et al.; "A Robust Sequential Approach for the Detection of Defective Pixels in an Image Sensor"; Mar. 1999; IEEE Internation Conference on Acoustics, Speech and Signal Processing; ICASSP '99 Proceedings; vol. 4, pp. 2239–2242.*

* cited by examiner

*Primary Examiner*—Ngoc-Yen Vu
*Assistant Examiner*—John M Villecco
(74) *Attorney, Agent, or Firm*—J.C. Patents

(57) ABSTRACT

A method of bad pixel correction for an image sensor. The image sensor has a plurality of rows, and each row includes at least one dark pixel on both ends of the row and valid pixels. The method comprises the steps of inserting a dummy value with a bad pixel flag into a first in first out (FIFO), wherein the dummy value is used for replacing a value of the dark pixel; determining whether a control signal is asserted, wherein the control signal is used for indicating that a current pixel is the valid pixels when the control signal is asserted; writing the values of the valid pixels into the FIFO when the control signal is asserted; determining whether the control signal is deasserted; and inserting a dummy value with a bad pixel flag into the FIFO when the control signal is deasserted.

4 Claims, 3 Drawing Sheets

METHOD OF BAD PIXEL CORRECTION

CROSS-REFERENCE TO RELATED APPLICATION

This application claims the priority benefit of U.S. Provisional Application serial No. 60/217,550, filed Jul. 12, 2000, the full disclosure of which is incorporated herein by reference.

BACKGROUND OF THE INVENTION

1. Field of Invention

The present invention relates to a method of bad pixel correction. More particularly, the present invention relates to a method of bad pixel flag on dark columns for bad pixel correction.

2. Description of Related Art

As the multimedia era is coming, digital information, such as digital images or digital movies, becomes more popular. Modern technology has highly developed, and the cost of image sensors for generating digital images or pictures reduces. More people can access these high technological products. However, there are still some problems about the image sensors.

Due to the current process, it is hard to fabricate an image sensor perfectly without any bad or defective pixel thereon. Therefore, there are always some defective pixels on the image sensor after it is fabricated. The image or picture sensed by the defective pixels will affect the quality of the image or picture. And the following imaging procedure, such as color processing or image compressing etc, will also affected. How to reduce the affect of the defective pixels of the image sensor becomes a significant topic.

Generally, if an image sensor has a bad pixel correction function, the correction scheme typically uses neighboring good pixel values to average the bad and good pixels, and then replaces the bad pixel with the averaged value. Furthermore, if one of the neighboring pixels is also bad, the correction scheme then uses the good pixel to replace the original bad pixel value. If both neighboring pixels are bad, the correction scheme uses the original value.

However, according to the mentioned conventional correction scheme, one problem occurs when the bad pixel is at the first location of a row. FIG. 1A shows the situation. Referring to FIG. 1A, because the image sensor is usually surrounded by dark pixels, which are covered with metal layers, to obtain the dark values of the image sensor. Therefore, when the image sensor tries to correct the bad pixel B at the first location 14 of a row 10, correction scheme averages the dark pixel D located at position 12 with the neighboring good pixel G located at position 16.

Ideally, the dark pixel D doesn't receive light information when the dark pixel D and the good pixel G are averaged. An incorrect value for the image sensor is still obtained. Namely, the bad pixel is not corrected.

Similarly, FIG. 1B shows a situation that a bad pixel is located at the end of a row. Referring to FIG. 1B, when the image sensor tries to correct the bad pixel B at the first location 14' of a row 10, correction scheme averages the dark pixel D located at position 12' with the neighboring good pixel G located at position 16'. The Correction scheme averages the dark pixel D (12') and the good pixel G (16'). An incorrect value for the image sensor is still obtained. Namely, the bad pixel is not corrected.

Accordingly, no matter the bad pixel is located at the beginning or end of a row, the conventional correction scheme does not work normally.

SUMMARY OF THE INVENTION

The invention provides a method of bad pixel correction for an image sensor. The image sensor has a plurality of rows, and each row includes at least one dark pixel on both ends of the row and valid pixels. The method comprises the steps of inserting a dummy value with a bad pixel flag into a first in first out (FIFO), wherein the dummy value is used for replacing a value of the dark pixel; determining whether a control signal is asserted, wherein the control signal is used for indicating that a current pixel is the valid pixels when the control signal is asserted; writing the values of the valid pixels into the FIFO when the control signal is asserted; determining whether the control signal is deasserted; and inserting a dummy value with a bad pixel flag into the FIFO when the control signal is deasserted.

The invention provides a method of bad pixel correction for an image sensor. The image sensor has a plurality of rows, and each row having a plurality of pixels consisting of valid pixels and dark pixels on both ends of the row.

First, a control signal is generated for indicating that a current pixel of the image sensor is a valid pixel or a dark pixel. Then, write a dummy value with a bad pixel flag into a first in first out (FIFO) if the control signal indicates the current pixel is the dark pixel; and write the value of the current pixel into the FIFO if the control signal indicates the current pixel is the valid pixel. A bad pixel correction is performed according to data stored in the FIFO.

Advantageously, the present invention provides a method of bad pixel correction. The method provides an easy way to avoid using dark pixel values when correcting the bad pixels for image sensors. In addition, the present method also reduces the cost.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings, FIGS. 1A and 1B respectively show a beginning and end of a row having a bad pixel and a dark pixel therein.

DESCRIPTION OF THE PREFERRED EMBODIMENTS

According to the method of bad pixel correction of the present invention, the method to solve the conventional problems is to keep track of the current column address of the image sensor and to determine whether a bad pixel is at the beginning or end of a series of valid pixels; ie, a row. To achieve these objects, the present invention uses an address comparator to generate a signal col_en, which is asserted when the pixels are valid.

Figure 1A:
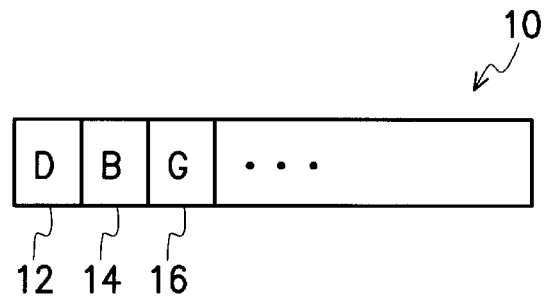
Figure 1B:
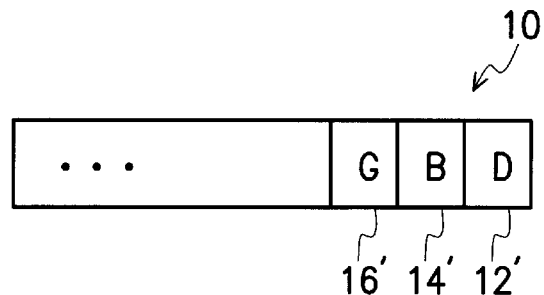
Figure 2:
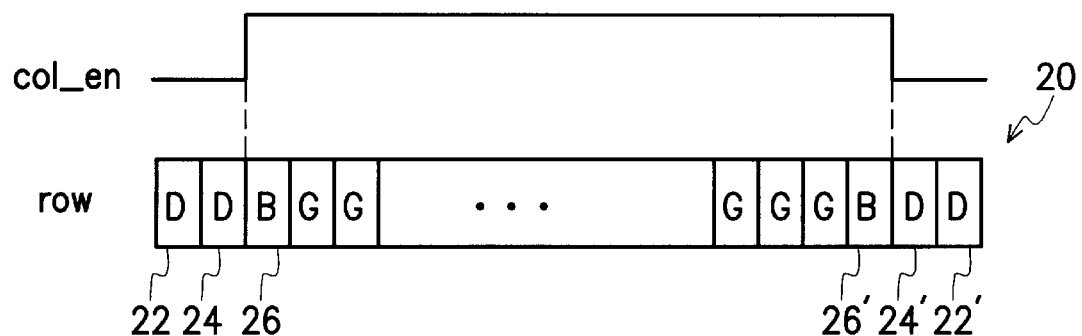
FIG. 2 schematically shows a row having dark pixels and a bad pixel on both the beginning and end of the row, and a signal col_en for indicating valid pixels of the row.

FIG. 2 shows the signal col_en to indicate the valid pixels of a row. According to the present invention, when a pixel address corresponds to a dark pixel, the signal col_en is deasserted, and when a pixel address corresponds to a valid pixel, the signal col_en is asserted. FIG. 2 also shows an exemplary row for description, the row 20 has two dark pixels D at locations 22, 24 and 22', 24' on both end sides of the row 20. In addition, valid pixels of the row begins and ends with a bad pixel B at the beginning and end locations 26, 26'. The signal col_en is asserted from location 26 to 26' for indicating the valid pixels.

In order to correct the bad pixels, a FIFO, (first in first out memory) is used to store, for example, 3 pixel values to perform the correction of the present invention. The 3 pixel values stored are the previous pixel, the current pixel, and the next pixel. The method for correcting the bad pixel is described in detail as follow.

Figure 3:
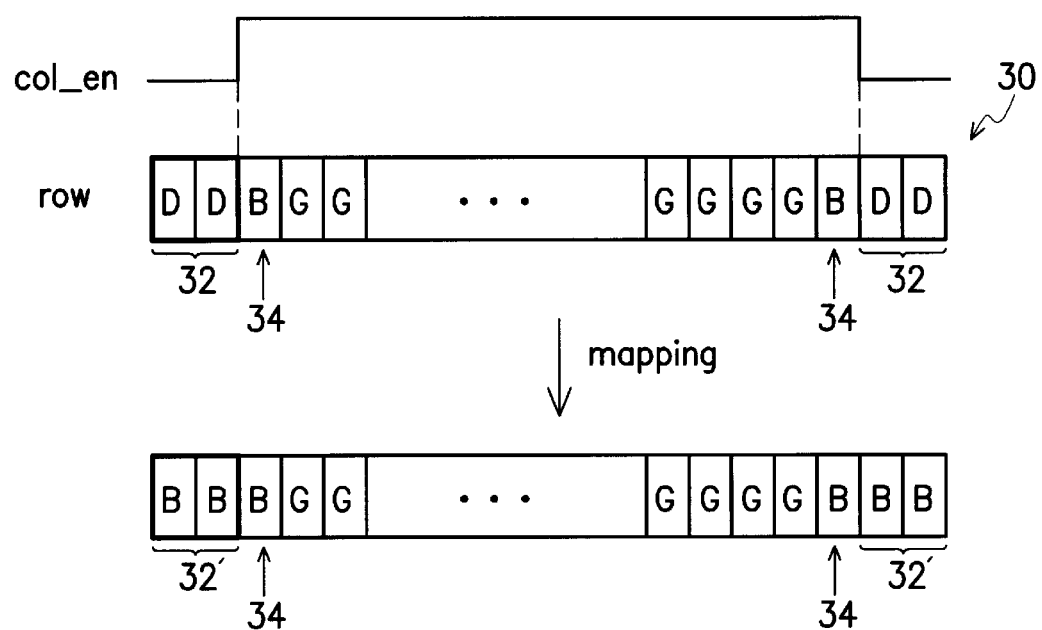
FIG. 3 schematically illustrates a mapping of FIG. 2 by replacing the dark pixels to bad pixel flags.

According to method of bad pixel correction of the present invention, dummy values with bad pixel flag are used for writing into the FIFO, rather than the real dark pixel values. Referring to FIG. 3, two columns of the dark pixels 22 of the row 30 are replaced by a bad pixel flag B 32'. FIG. 3 shows a mapping of FIG. 2.

Figure 4:
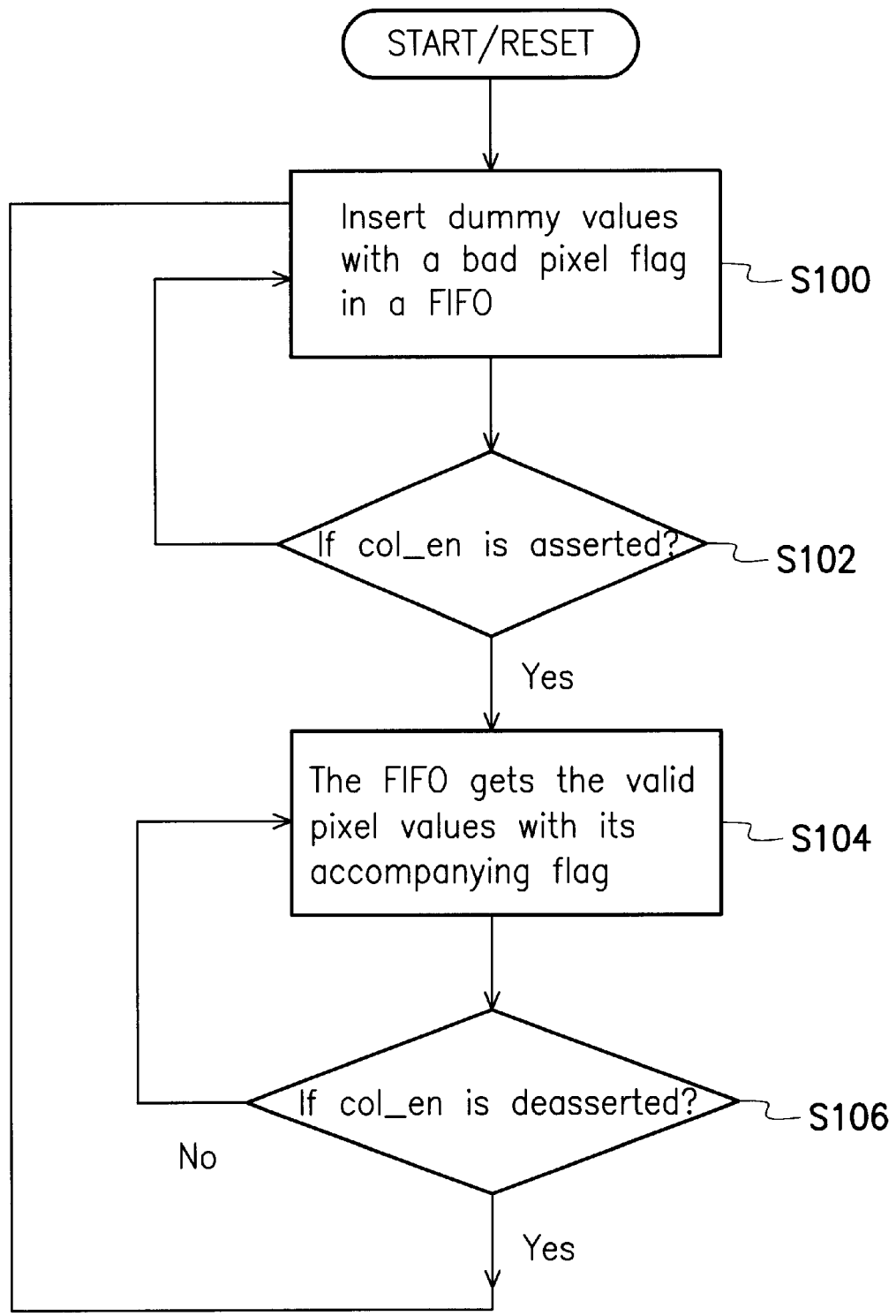
FIG. 4 schematically shows a flow chart of the method of bad pixel correction according to the present invention.

FIG. 4 schematically shows a flow chart of the method of bad pixel correction according to the present invention. After the image sensor resets, at step S100, dummy values with a bad pixel flag, which are used for replacing the dark pixel values, are written into the FIFO. At step S102, the image sensor detects whether the signal col_en is asserted. If the signal col_en is not asserted, it means that the current pixel is still a dark pixel and then returns to the step S100 for continuously writing dummy values with bad pixel flag into the FIFO. Otherwise, if the signal col_en is asserted, it means that the current pixel is a valid pixel and then processes to the step S104.

At step S104, as the signal col_en is asserted, the valid pixel values of the row are consecutively written into the FIFO. And a bad pixel correction is performed.

At step 106, the image sensor detects whether the signal col_en is deasserted. If the signal col_en is still asserted, and the process returns to the setp S104 to consecutively write the valid pixel values into the FIFO. In addition, if the signal col_en is deasserted, which means dark pixels appear again, and the process returns to the setp S100 to write the dummy values with bad pixel flag into the FIFO.

Therefore, in this way, because the dummy values, ex. all zeros, are viewed as bad pixels for a correction circuit. The correction circuit does not average the dark pixel and neighboring good pixel when the bad pixel is either in the beginning or end of the row. In stead, it just uses the good pixel, or the original pixel when the neighboring pixel is also bad. Then, the problem mentioned above is solved.

Advantageously, the present invention provides a method of bad pixel correction. The method provides an easy way to avoid using dark pixel values when correcting the bad pixels for image sensors. In addition, the present method also reduces the cost.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of bad pixel correction for an image sensor, the image sensor having a plurality of rows, and each row including at least one dark pixel on both ends of the row and valid pixels, the method comprising:

inserting a dummy value with a bad pixel flag into a first in first out (FIFO), wherein the dummy value is used for replacing a value of the dark pixel;

determining whether a control signal is asserted, wherein the control signal is used for indicating that a current pixel is the valid pixels when the control signal is asserted;

writing the values of the valid pixels into the FIFO when the control signal is asserted;

determining whether the control signal is deasserted; and inserting a dummy value with a bad pixel flag into the FIFO when the control signal is deasserted.

2. The method of claim 1, wherein the dummy value is zero.

3. A method of bad pixel correction for an image sensor, the image sensor having a plurality of rows, and each row having a plurality of pixels consisting of valid pixels and dark pixels on both ends of the row, the method comprising:

generating a control signal for indicating that a current pixel of the image sensor is a valid pixel or a dark pixel;

writing a dummy value with a bad pixel flag into a first in first out (FIFO) if the control signal indicates the current pixel is the dark pixel;

writing the value of the current pixel into the FIFO if the control signal indicates the current pixel is the valid pixel; and performing a bad pixel correction according to data stored in the FIFO.

4. The method of claim 3, wherein the dummy value is zero.

* * * * *